(12) United States Patent
Kotanides, Jr.

(10) Patent No.: US 8,776,854 B2
(45) Date of Patent: Jul. 15, 2014

(54) PNEUMATIC TIRE WITH IMPROVED CROWN DURABILITY

(75) Inventor: John Kotanides, Jr., Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 406 days.

(21) Appl. No.: 13/219,829

(22) Filed: Aug. 29, 2011

(65) Prior Publication Data
US 2013/0048184 A1    Feb. 28, 2013

(51) Int. Cl.
*B60C 9/20* (2006.01)
*B60C 9/18* (2006.01)
*B60C 9/28* (2006.01)

(52) U.S. Cl.
CPC .............. *B60C 9/2006* (2013.01); *B60C 9/18* (2013.01); *B60C 2009/2019* (2013.01); *B60C 9/28* (2013.01); *B60C 2200/06* (2013.01); *B60C 2009/2016* (2013.01)
USPC ........................... 152/534; 152/527; 152/535

(58) Field of Classification Search
CPC .............. B60C 9/18; B60C 9/20; B60C 9/22; B60C 2009/2016; B60C 2009/2019; B60C 2009/2022; B60C 9/28; B60C 9/2006; B60C 2200/06
USPC .................................. 152/534, 535, 527, 526
IPC ........................................ B60C 9/18, 9/20, 9/22
See application file for complete search history.

(56) References Cited

U.S. PATENT DOCUMENTS

| | | | |
|---|---|---|---|
| 3,516,468 A * | 6/1970 | Jones | 152/528 |
| 3,685,564 A | 8/1972 | Smithkey, Jr. | |
| 4,446,905 A | 5/1984 | Tamura et al. | |
| 4,526,217 A | 7/1985 | Maeda et al. | |
| 4,785,861 A * | 11/1988 | Fujiwara | 152/209.14 |
| 5,131,446 A * | 7/1992 | Fukumoto et al. | 152/532 |
| 5,201,969 A | 4/1993 | Nishi et al. | |
| 5,261,475 A | 11/1993 | Yoshino et al. | |
| 5,327,954 A | 7/1994 | Nakamura | |
| 5,435,369 A | 7/1995 | Yap et al. | |
| 5,707,467 A | 1/1998 | Matsumaru et al. | |
| 5,772,810 A * | 6/1998 | Cluzel | 152/531 |
| 6,223,796 B1 | 5/2001 | Magee et al. | |
| 6,536,496 B1 | 3/2003 | Bondu | |

(Continued)

FOREIGN PATENT DOCUMENTS

| | | |
|---|---|---|
| DE | 102010000181 | 7/2011 |
| EP | 1547818 | 6/2005 |
| JP | 1178004 | 7/1989 |

*Primary Examiner* — Justin Fischer
*Assistant Examiner* — Philip N Schwartz
(74) *Attorney, Agent, or Firm* — David L King

(57) ABSTRACT

The invention is directed to pneumatic tires for heavy vehicle service that include a carcass, a tread disposed radially outward of the carcass, a sidewall intersecting the tread at a shoulder, and a belt reinforcing structure positioned radially between the carcass and the tread. The belt reinforcing structure includes four belt layers, each layer reinforced by parallel cords the four belts characterized by their cord orientation and angles. A first radially inner belt layer, an adjacent second belt layer overlaying the first belt layer and a third belt layer overlaying the second belt layer are all oriented directionally extending right (R) relative to an equatorial center plane of the tire, a fourth radially outer belt layer overlaying the third belt layer has cords directionally extending left (L). The pneumatic tires of the invention containing these belt layers have improved crown durability and stiffness while maintaining the same overall tire weight.

11 Claims, 3 Drawing Sheets

(56) References Cited

U.S. PATENT DOCUMENTS

| | | |
|---|---|---|
| 6,668,890 B1 | 12/2003 | Kadota |
| 7,267,149 B2 | 9/2007 | Kotanides, Jr. |
| 7,404,425 B2 | 7/2008 | Hardy et al. |
| 2002/0189736 A1 | 12/2002 | Sinopoli et al. |
| 2005/0133138 A1 | 6/2005 | Kotanides |
| 2010/0269967 A1 | 10/2010 | Maruoka |

* cited by examiner

PNEUMATIC TIRE WITH IMPROVED CROWN DURABILITY

TECHNICAL FIELD

The present invention generally relates to pneumatic tires and, more specifically, to pneumatic tires for use on large commercial vehicles.

BACKGROUND OF THE INVENTION

Pneumatic tires for severe service applications on heavy vehicles that operate at slow speeds, such as refuse trucks, construction trucks, buses and tankers, are prone to significant heat buildup in the tire crown area. The heat buildup reduces both belt edge durability and crown durability. Conventional pneumatic tires incorporate a belt package that includes multiple cut belt layers wrapped about the circumference of the tire. Typically, the cut belt layers in conventional pneumatic tires for use on such heavy vehicles are formed from a single type of belt wire and are narrower in width than the tire footprint. Conventionally, the width of the widest cut belt layer is less than 90% of the tire footprint. The belt layers are most typically stacked in layers with the cords being oriented equally, but oppositely directed between adjacent layers.

One specific type of pneumatic tire, the 11R24.5 G286 LR 'H' tire, for use in severe service applications is constructed with four individual cut belts each formed from a single type of belt wire. Two of the cut belt layers are deemed the working belt layers. The green widths of the working belt layers of the LR 'H' tire, which has a footprint width of 7.89", are 7.00" and 7.80", respectively, and the corresponding cured belt widths are 6.40" and 7.00", respectively. The cured belt widths are approximately 81% and 89% of the tire footprint, respectively. The contribution of the two working belts alone to the overall tire weight is 14.31 lbs. Individually, the weight contribution for one working belt is about 6.79 pounds and the weight contribution for the other working belt, which is the wider of the two working belts, is about 7.52 pounds.

To solve this durability issue, the inventor John Kotanides Jr. in U.S. Pat. No. 7,267,149 proposed a pneumatic tire for service on heavy vehicles having a belt package with widened belts. The tire included a belt reinforcing structure or belt package having multiple cut belts of which one of the cut belts has a width approximately equal to the tire footprint. Widening two of the cut belts and forming at least one of the widened cut belts from a lighter material serves to improve tire durability in the regions of the tire crown and shoulder without increasing the overall tire weight.

In service applications like commercial bus tires, not only is the crown region subject to high temperatures, but also the bead area adjacent the hot brakes become overheated during use.

Tires under exposure to heavy loads and constant stops for braking such as buses and waste haulers see extremely high service temperatures. These high temperatures reduce the life of the tires. One way to reduce tire heat buildup is to cut the weight of some of the belt layers as the width was increased as was accomplished in U.S. Pat. No. 7,267,149. This is only feasible if the tire is made sufficiently strong for its required service application. A cool running, but inferior strength tire casing is not a workable solution. It is this dilemma that is most difficult and challenging to solve when designing tires for these heavy loaded commercial vehicles such as waste haulers and buses.

For these and other reasons, it would be desirable to modify pneumatic tires for severe service applications on heavy vehicles so as to improve tire durability and stiffness without significantly increasing tire weight.

SUMMARY OF THE INVENTION

The invention is directed to pneumatic tires for heavy vehicle service that include a carcass, a tread disposed radially outward of the carcass, a sidewall intersecting the tread at a shoulder, and a belt reinforcing structure positioned radially between the carcass and the tread. The belt reinforcing structure includes four belt layers, each layer reinforced by parallel cords the four belts characterized by their cord orientation and angles. A first radially inner belt layer, an adjacent second belt layer overlaying the first belt layer and a third belt layer overlaying the second belt layer are all oriented directionally extending right (R) relative to an equatorial center plane of the tire, a fourth radially outer belt layer overlaying the third belt layer has cords directionally extending left (L). The pneumatic tires of the invention containing these belt layers have improved crown durability and stiffness while maintaining the same overall tire weight.

Definitions

As used herein and in the claims.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Cord" means one of the reinforcement strands of which the plies in the tire are comprised.

"Crown" refers to substantially the outer circumference of a tire where the tread is disposed.

"Circumferential" means circular lines or directions extending along the surface of the sidewall perpendicular to the axial direction.

"Cut belt or cut breaker reinforcing structure" means at least two cut layers of plies of parallel cords, woven or unwoven, underlying the tread, unanchored to the bead, and having both left and right cord angles in the range from 10 degrees to 33 degrees with respect to the equatorial plane of the tire.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire.

"Lateral" means a direction parallel to the axial direction, as in across the width of the tread or crown region.

"Outer" means toward the tire's exterior.

"Pneumatic tire" means a laminated mechanical device of generally toroidal shape, usually an open-torus having beads and a tread and made of rubber, chemicals, fabric and steel or other materials.

"Radial" and "radially" mean directions radially toward or away from the axis of rotation of the tire.

"Shoulder" means the upper portion of sidewall just below the tread edge.

"Sidewall" means that portion of a tire between the tread and the bead area.

"Tread" means a molded rubber component which, when bonded to a tire casing, includes that portion of the tire that comes into contact with the road when the tire is normally inflated and under normal load.

BRIEF DESCRIPTION OF THE DRAWINGS

The structure The accompanying drawing, which is incorporated in and constitutes a part of this specification, illustrates an embodiment of the invention and, together with a general description of the invention given above, and the detailed description given below, serves to explain the invention.

DETAILED DESCRIPTION OF THE INVENTION

Figure 1:
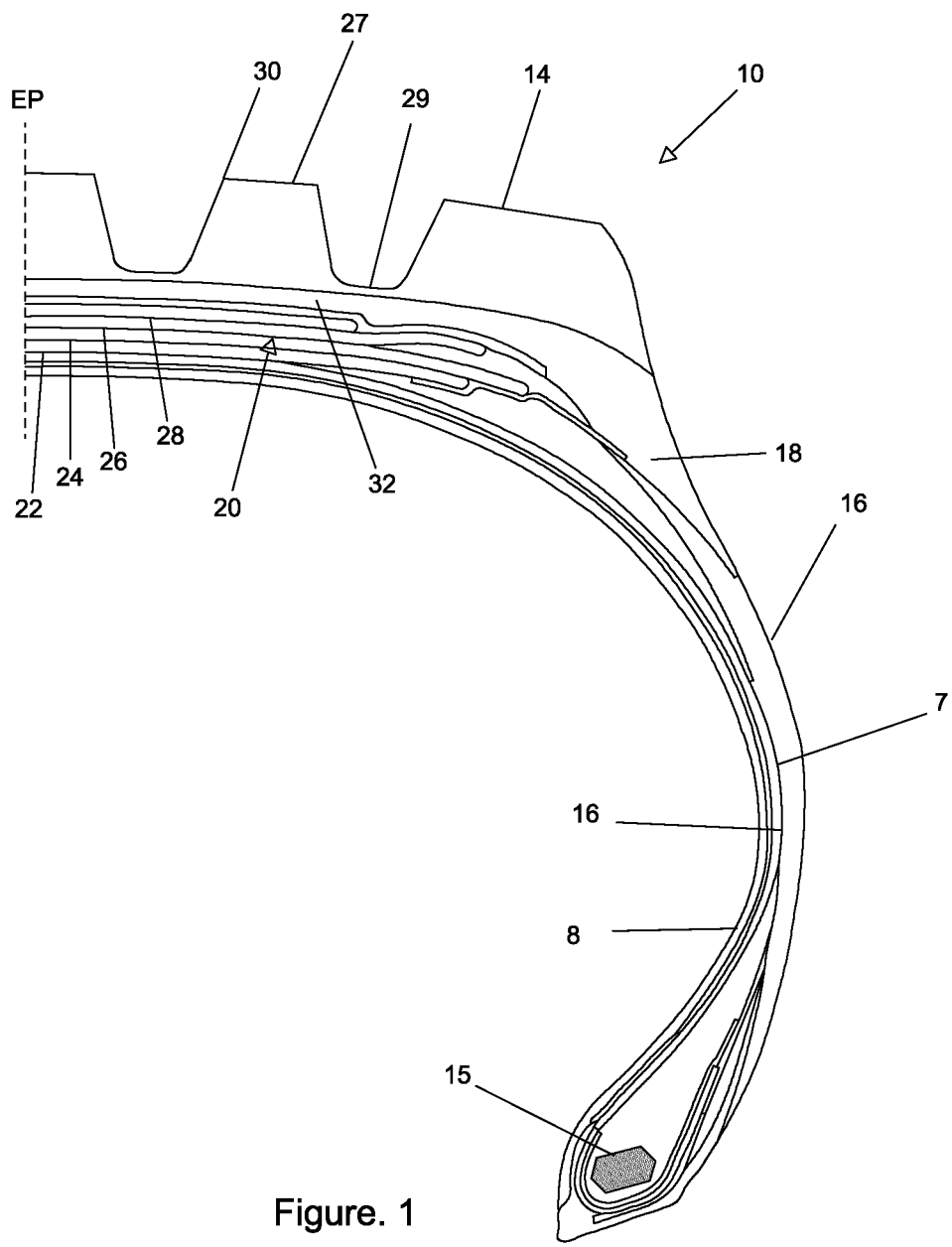
FIG. 1 is a cross-sectional view of a pneumatic tire in accordance with an embodiment of the invention.
Figure 3:
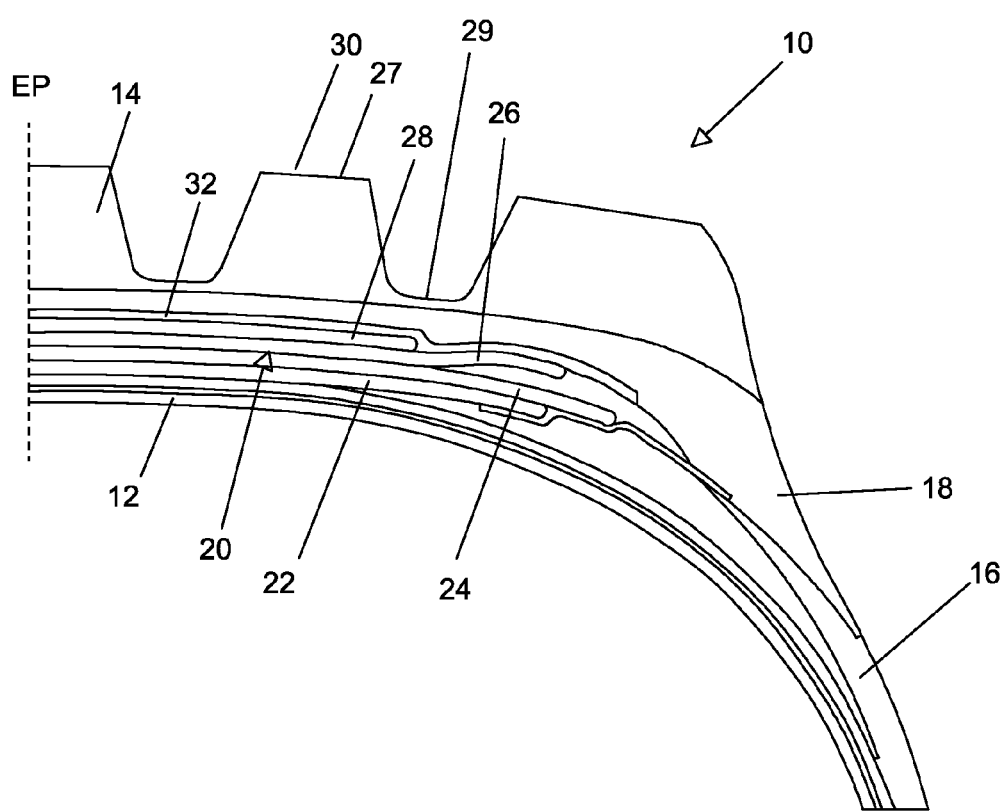
FIG. 3 is an enlarged cross section of a shoulder portion of the tire of FIG. 1 showing the belt edges.

With reference to the FIGS. 1 and 3, a pneumatic tire 10 includes a carcass 12, a ground-engaging tread 14, a sidewall 16, and a shoulder 18 defined at the juncture between the sidewall 16 and the tread 14. The tread 14 has a ground contacting surface 27 separated by grooves 29. When mounted on a vehicle, the tread 14 furnishes traction and tire 10 contains a fluid that supports the vehicle load. The tire carcass 12 has one or more carcass plies 7 extending from the bead 15 under the belt structure 20 to the opposite bead 15. Radially inward of the at least one ply 7 is an air impervious inner liner 8. Pneumatic tire 10 is understood to have mirror symmetry for reflection about an equatorial plane EP bisecting tire 10 so that the following description is understood to apply to the full tire width. Pneumatic tire 10 has a footprint (FP), as described hereinabove.

Arranged radially between the carcass 12 and the tread 14 is a belt package 20, generally indicated by reference numeral 20, that includes a plurality of, for example, four individual cut belt plies or layers 22, 24, 26, and 28. The cut belt layers 22, 24, 26, and 28 are formed of polyester, nylon or aramid cord or monofilament steel cord reinforcement encased inside a corresponding elastomer coating. The cut belt layers 22, 24, 26, and 28 reinforce a crown 30 of the tire 10 and are applied to the tire 10 as individual spliced sheets of cord reinforcement. A tread cushion 32 is provided radially outward of the cut belt layers 22, 24, 26, and 28 for joining the tread 14 with the belt package 20. In the tire making process, the green carcass 12, tread 14, sidewalls 16 and belt package 20 are united and then mounted in a curing mold for vulcanizing the tire 10.

Figure 2:
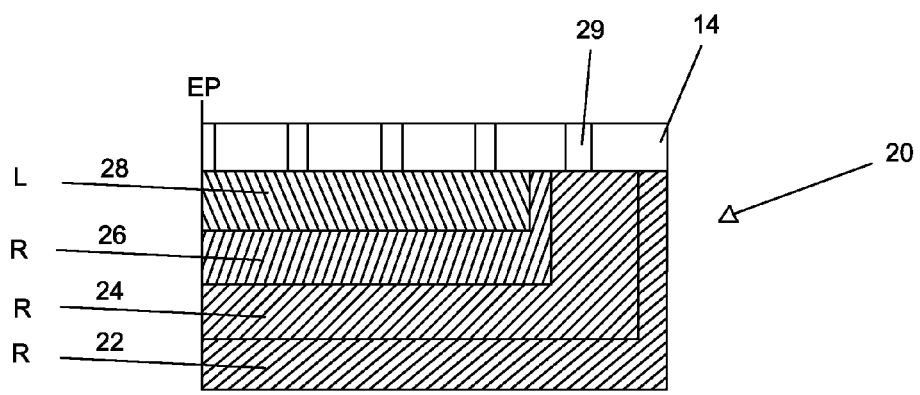
FIG. 2 is a plan view showing the four belt layers of the belt structure of the tire of FIG. 1 and the direction and orientation of the cord in each belt layer.
Figure 5:
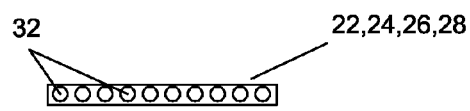
FIG. 5 is an exemplary cross section of any one of the belt layers.

In a preferred embodiment of the invention, the pneumatic tire 10 has a belt reinforcing structure 20 positioned between the carcass 12 and the tread 14. The belt reinforcing structure 20 includes four belt layers, a radially inner first belt layer 22, a second belt layer 24 arranged adjacent to and radially outward from the first belt layer 22 and a third belt layer 26 overlaying and adjacent to the second belt layer 24 and a fourth belt layer 28 overlaying and radially outward of the third belt layer 26. As shown in FIG. 5, each belt layer 22, 24, 26, 28 is reinforced with a plurality of parallel cords 32. As shown in FIG. 2, the four layer belt structure 20 is characterized by having the first 22, second 24 and third 26 belt layers having cords directionally oriented relative to an equatorial center plane EP of the tire 10 extending to the right (R) whereas the fourth belt layer 28 has the cords extending to the left (L) to form a four layer stacked belt structure 20 of cords sequentially oriented RRRL. In the preferred embodiment, the first belt layer 22 and second belt layer 24 have the parallel cords oriented right (R) angularly in a range of 45 to 65 degrees relative to the equatorial plane. The third belt layer 26 has the cords oriented right (R) in a range of 16 to 25 degrees relative to the equatorial plane. The fourth belt layer 28 is oriented left (L) in a range 16 to 25 degrees relative to the equatorial plane 19. Preferably the first belt layer 22 has cords angled at a larger angle than the cords of the second belt layer 24. The cords of the first belt layer 22 preferably are 5 degrees right greater than the cords of the second belt layer 24. In the preferred embodiment, the first belt layer 22 cords are oriented at 50 degrees right (R) and the cords of the second belt layer 24 are oriented at 45 degrees right (R). The cords of the fourth belt layer 28 are oriented left (L) at an angle greater than the cords of the third belt layer 26 that are oriented to the right (R). The fourth belt layer 28 has the cords at least 3 degrees greater than the right (R) cord angles of the third belt layer 26. The third belt layer 26 has cords oriented right (R) at an angle of 19 degrees whereas the overlaying cords of the fourth belt layer 28 are angled at 23 degrees left (L).

When this preferred embodiment tire was made in a size 315/80/22.5 radial pneumatic tire having the belt structure 20 as described above it was determined that the second belt layer 24 operated much cooler than a prior art tire. This is believed to be caused by the combination of a RRRL belt structure wherein the underlying first belt layer 22 and the overlying third belt layer 26 directionally oriented the same as the second belt layer 24 assists the second belt layer 24 particularly around the belt edges to maintain the cooler temperature than would otherwise be achieved by a conventional opposite orientation of adjacent cords within adjacent belt layers. This ability to achieve cooler temperatures in the belt edge region greatly improves the crown durability of the overall tire structure. It is important to understand that this structure as described herein in the size tire used for mixed service heavy loaded vehicles in mixed service applications such as waste haulers or buses is quite beneficial in that it assists the belt structure in maintaining its structural integrity due to the fact that it operates at a much cooler temperature than heretofore achieved.

In a test trial run a prior art tire having a conventional belt structure having four belt layers oriented at RRLL had an internal tire cavity temperature of 121.5 degrees C. and an interlaminate shear of 0.701. The prior art control tire had the four belt layers oriented from the radially inner through the radially outer at 55 degrees R, 18 degrees R, 18 degrees L and 18 degrees L respectively. Both the prior art control tire and the tire 10 of the invention had the cords of the first inner belt at 10 EPI (ends per inch) and the remaining three belts at 14 EPI each. The cords 32 in the belts 24, 26 and 28 were UD14 cords which is a 3+3x0.35 ST steel wire construction. The radially inner belt 22 used cords 32 made of US10 which is a 3+2x0.35 ST steel wire construction. The inventive tire of the RRRL belt construction with 50 degrees R, 45 degrees R, 19 degrees R and 23 degrees L had a cavity temperature of 114.5 degrees C. and an interlaminar shear rating of 0.285. This was a considerable difference and evidences far better operating performance at the belt edges.

Figure 4:
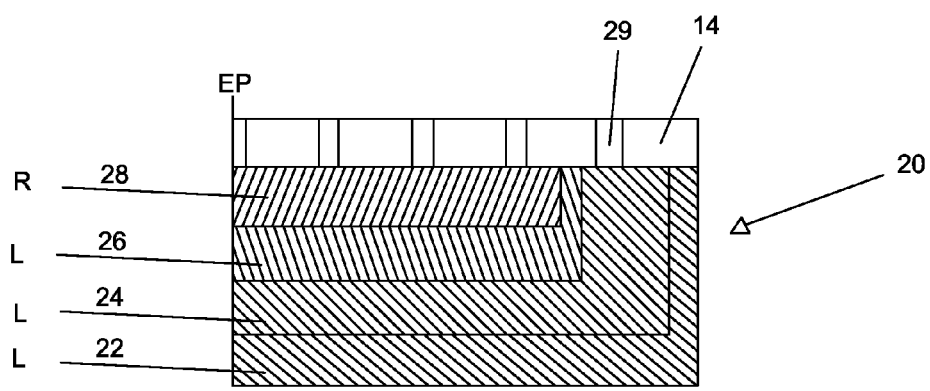
FIG. 4 is a plan view similar to FIG. 2, but depicting an alternate embodiment tire belt structure made as a mirror image of the belt structure in FIG. 2.

It is important to note with reference to FIG. 4 that an alternative tire belt structure can be constructed wherein the RRRL belt layers 22, 24, 26, 28 of the preferred invention can be produced as a mirror image having a LLLR belt structure. This mirror image belt structure when made similar to that previously described using the same ranges of cord angles only oppositely oriented when assembled is expected to perform as well as the test tires made with a RRRL configuration. It is important to note that any mirror image of the construction is considered within the scope of the present invention. What is important is that the directionally same orientation of the first 22, second 24 and third belt 26 layers achieves a great assistance for the second belt layer 24 in the belt edge region such that the second belt layer 24 will achieve a cooler operating temperature than would otherwise be achieved.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A pneumatic tire for heavy vehicle service, comprising:
a carcass;
a tread disposed radially outward of said carcass;
a sidewall intersecting said tread at a shoulder; and
a belt reinforcing structure positioned radially between said carcass and said tread, said belt reinforcing structure being four belt layers, a radially inner first belt layer and a second belt layer arranged adjacent to and radially outward from said first belt, a third belt layer overlaying and adjacent to said second belt layer and a fourth belt layer overlaying and radially outward of said third belt layer, each belt layer being reinforced with a plurality of parallel cords, the belt structure characterized by having the first, second and third belt layers having the cords directionally oriented relative to an equatorial center plane of the tire extending to the right (R) and the fourth belt layer having the cords extending to the left (L) to form a four layer stacked belt structure of cords sequentially oriented RRRL; and
wherein the first belt layer and second belt layer have the parallel cords oriented right (R) angularly in the range of 45 degrees to 65 degrees relative to the equatorial plane EP, the third belt layer has cords oriented right (R) in the range of 16 degrees to 25 degrees relative to the equatorial plane EP, the fourth belt layer is oriented left (L) in the range of 16 degrees to 25 degrees relative to the equatorial plane EP and wherein the first belt layer has cords angled at a larger angle than the cords of the second belt layer, and the cords of the fourth belt layer are oriented to the left (L) at an angle greater than the cords of the third belt layer that are oriented to the right (R) and the cord angle of the first belt layer is 5 degrees right (R) greater than the cords of the second belt layer, and the fourth belt layer has cords oriented left (L) at least 3 degrees or greater than the right (R) angle of cords of the third belt layer.

2. The pneumatic tire for heavy vehicle service of claim 1 wherein the cords of the first belt layer are oriented 50 degrees right (R) and the cords of the second belt layer are oriented 45 degrees right (R).

3. The pneumatic tire for heavy vehicle service of claim 1 wherein the third belt has cords oriented right (R) at an angle of 19 degrees.

4. The pneumatic tire for heavy vehicle service of claim 3 wherein the cords of the fourth belt layer are angled 23 degrees left (L).

5. A pneumatic tire for heavy vehicle service, comprising:
a carcass;
a tread disposed radially outward of said carcass;
a sidewall intersecting said tread at a shoulder; and
a belt reinforcing structure positioned radially between said carcass and said tread, said belt reinforcing structure including four belt layers, a radially inner first belt layer and a second belt layer arranged adjacent to and radially outward from said first belt, a third belt layer overlaying and adjacent to said second belt layer and a fourth belt layer overlaying and radially outward of said third belt layer, each belt layer being reinforced with a plurality of parallel cords, the belt structure characterized by having the first, second and third belt layers having the cords directionally oriented relative to an equatorial center plane of the tire extending to the right (R) and the fourth belt layer having the cords extending to the left (L) to form a four layer stacked belt structure of cords sequentially oriented RRRL wherein the cords of the first belt layer are oriented 50 degrees right (R) and the cords of the second belt layer are oriented 45 degrees right (R) and wherein the cords of the third belt layer are oriented right (R) at 19 degrees and the cords of the fourth belt layer are oriented Left (L) at 23 degrees.

6. The pneumatic tire for heavy vehicle service of claim 5 wherein the cords of the first belt layer are 10 EPI and the cords of the second, third and fourth belt layers are 14 EPI.

7. The pneumatic tire for heavy vehicle service of claim 5 wherein the cords of the first layer are a 3 +2x 0.35 ST steel wire construction.

8. The pneumatic tire for heavy vehicle service of claim 6 wherein the cords of the second, third and fourth layer are a 3 +3x 0.35 ST steel wire construction.

9. The pneumatic tire for heavy vehicle service of claim 7 wherein the pneumatic tire is a radial tire.

10. The pneumatic tire for heavy vehicle service of claim 9 wherein the radial tire is a size 315/80/22.5.

11. The pneumatic tire for heavy vehicle service of claim 1 wherein the cords of the first belt layer are 10 EPI and the cords of the second, third and fourth belt layers are 14 EPI.

* * * * *